United States Patent [19]

Sederquist

[11] Patent Number: 4,539,267

[45] Date of Patent: Sep. 3, 1985

[54] PROCESS FOR GENERATING STEAM IN A FUEL CELL POWERPLANT

[75] Inventor: Richard A. Sederquist, Newington, Conn.

[73] Assignee: United Technologies Corporation, Hartford, Conn.

[21] Appl. No.: 678,606

[22] Filed: Dec. 6, 1984

[51] Int. Cl.³ ............................................. H01M 8/06
[52] U.S. Cl. .......................................... 429/17; 429/19
[58] Field of Search ...................... 429/17, 19, 20, 13, 429/16, 26

[56] References Cited

U.S. PATENT DOCUMENTS

| | | | |
|---|---|---|---|
| 3,677,823 | 7/1972 | Trocciola | 429/17 |
| 3,973,993 | 8/1976 | Bloomfield et al. | 429/17 |
| 3,976,507 | 8/1976 | Bloomfield | 429/17 |
| 4,001,041 | 1/1977 | Menard | 429/19 |
| 4,004,947 | 1/1977 | Bloomfield | 429/17 |
| 4,037,024 | 7/1977 | Landau | 429/17 |
| 4,072,625 | 2/1978 | Pinto | 48/196 A |
| 4,333,992 | 6/1982 | Healy | 429/26 |
| 4,372,759 | 2/1983 | Sederquist et al. | 429/17 |

Primary Examiner—Donald L. Walton
Attorney, Agent, or Firm—Stephen E. Revis

[57] ABSTRACT

The steam for a steam reforming reactor of a fuel cell powerplant is generated by humidifying the reactor feed gas in a saturator by evaporating a small portion of a mass of liquid water which circulates in a loop passing through the saturator. The water is reheated in each pass through the loop by waste heat from the fuel cell, but is not boiled. In the saturator the relatively dry feed gas passes in direct contact with the liquid water over and through a bed a high surface area material to cause evaporation of some of the water in the loop. All the steam requirements for the reactor can be generated in this manner without the need for a boiler; and steam can be raised at a higher total pressure than in a boiler heated by the same source.

2 Claims, 1 Drawing Figure

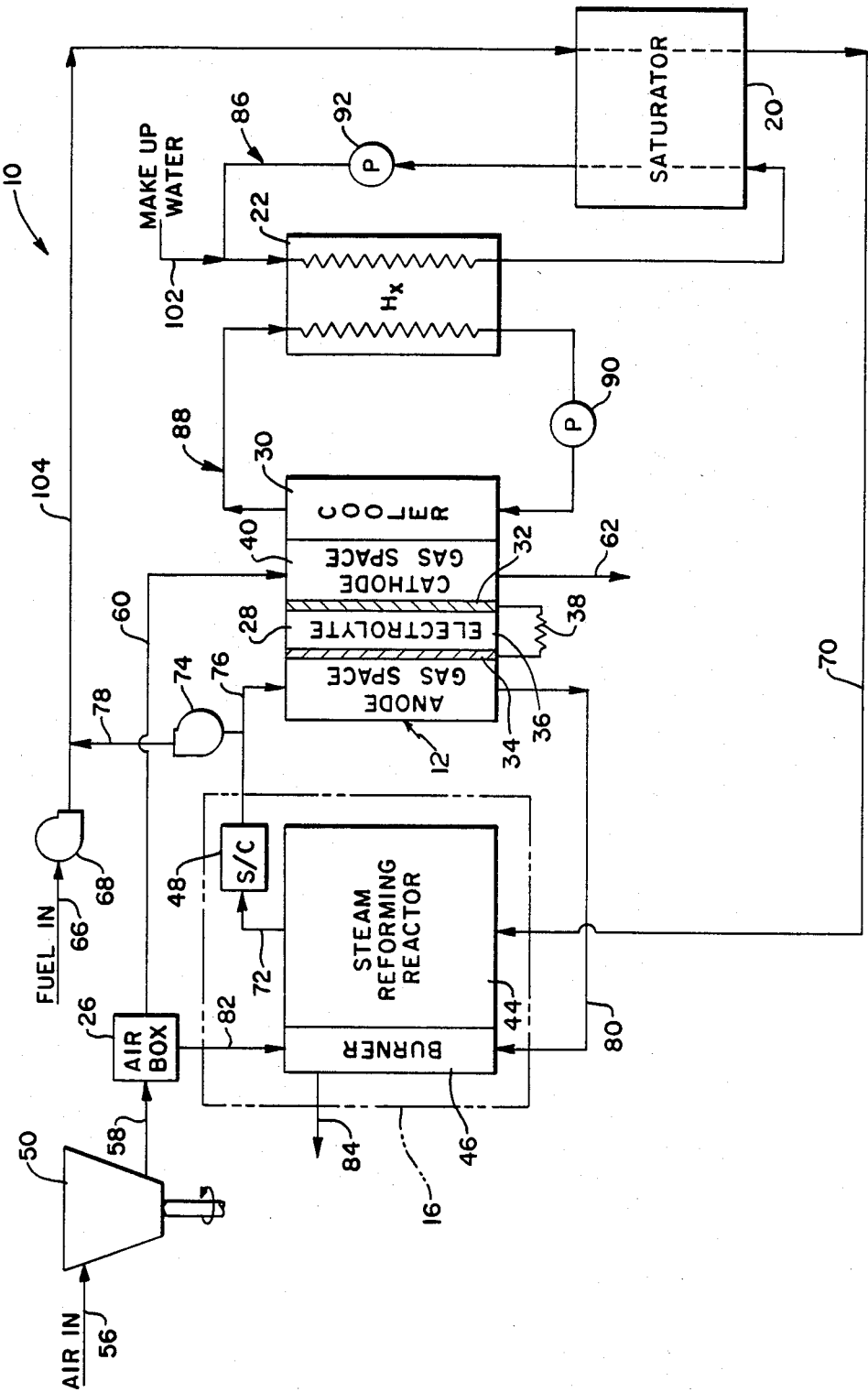

PROCESS FOR GENERATING STEAM IN A FUEL CELL POWERPLANT

DESCRIPTION

1. Cross Reference to Related Patent Application

The subject matter of this application is related to the subject matter of commonly owned U.S. patent application Ser. No. 678,612 titled "Process For Humidifying A Gaseous Fuel System" by Richard A. Sederquist, and U.S. patent application Ser. No. 678,611 titled "Process For Removing Electrolyte Vapor From Fuel Cell Exhaust Gas" by Richard A. Sederquist, both filed on even day herewith.

2. Technical Field

This invention relates to fuel cell powerplants including integrated fuel processing apparatus requiring steam.

3. Background Art

Fuel cell powerplants of the prior art often include fuel processing apparatus integrated therewith for converting a hydrocarbon fuel to hydrogen which is used as the fuel to operate one or more stacks of fuel cells for generating electricity. One common type of fuel processing apparatus is a steam reforming reactor which endothermically reacts a hydrocarbon fuel with steam in the presence of a catalyst to produce hydrogen and carbon oxides. For fuel cell powerplants to be commercially competitive with alternative systems for producing electricity, the powerplant must operate as efficiently as possible, and the cost of the apparatus must be as low as possible. Thus, it is often desirable to be able to eliminate or reduce the size of certain components.

One component found in most fuel cell powerplants is a boiler which is used as part of a process to produce the steam for the steam reforming reactor. Two patents which describe fuel cell powerplants having integrated steam reforming reactors and boilers for producing the steam for the reactors are commonly owned U.S. Pat. Nos. 4,001,041 and 4,004,947. In most of the several powerplants described therein the fuel cell stack is cooled by a closed, two phase coolant loop wherein water is passed in indirect heat exchange relation with the cells and is boiled, the heat of vaporization being used to cool the cells. The steam for the steam reforming reactor is generated in a boiler which is fed water condensed from fuel cell stack exhaust gases. The heat for creating the steam in the boiler is provided by the heated water and steam within the coolant loop which is circulated in indirect heat transfer relation with the stack.

It is often desirable to operate the fuel cell powerplant using pressurized reactants. This requires that the steam and the hydrocarbon fuel fed to the steam reform reactor must be pressurized to at least the level at which it is desired to operate the steam reforming reactor which feeds hydrogen rich gas to the fuel cells. In these prior art systems, the maximum steam pressure which can be raised is limited by the boiling temperature of the cell coolant, which is typically water. For example, in a fuel cell operating at 400° F., with a two phase coolant temperature of 376° F., the pressure of the water vapor produced in the boiler can be no higher than 186 psi. Higher pressures can only be generated in the boiler by increasing cell temperature, which may not be possible due to material temperature limits. It is desireable to be able to increase reactant pressures without increasing the cell stack temperature, or alternatively, to reduce cell stack temperature without having to reduce the pressure of the reactants due to steam pressure limitations.

Even in other types of operations which involve steam reforming hydrocarbons under pressure it has been the practice to obtain the great majority of required steam using a boiler which is heated indirectly by heat generated elsewhere in the process. For example, this is the case in the systems described in U.S. Pat. Nos. 4,072,625 and 4,238,403, where 10 to 30% of the steam for a reactor is produced by humidifying the gas stream in a saturator. In the saturator a dry hydrocarbon is passed into direct contact with a recirculating stream of liquid water heated by low grade waste heat and picks up the water evaporated therefrom. A boiler provides the balance of the steam for those systems; and the pressure in the steam reform reactor is still limited by the pressure at which steam can be raised in the boiler through an indirect heat exchange process.

Commonly owned U.S. Pat. No. 3,677,823 describes a fuel cell powerplant which also includes a boiler to produce at least part of the steam for a steam reforming reactor, the heat for the boiler being provided by the exhaust from the reactor burner. The remainder of the steam is provided by humidifying the fuel in a saturator. In the saturator water and the fuel gas are heated together through a heat exchanger wall.

Disclosure of Invention

One object of the present invention is an improved process for raising steam for a steam reforming reactor integrated with a fuel cell stack and a fuel cell powerplant.

Another object of the present invention is a process for operating a fuel cell powerplant including a steam reforming reactor wherein no steam boilers are required to produce steam for the reactor.

According to the present invention, the steam requirements for the steam reforming reactor of a fuel cell powerplant is provided by bringing the hydrocarbon feed stock for the reactor into direct contact with the hot liquid of a recirculating liquid water loop in a saturator wherein water from the loop evaporates into the gas stream, and the heat for the water, including the heat of vaporization is provided by the heat generated in the fuel cells of the powerplant.

More specifically, a loop of circulating water is brought into indirect heat exchange relation with the fuel stack of a powerplant to heat the water close to but under its boiling point. Preferably the heating of the water is accomplished by bringing it into indirect heat exchange relation with a two phase dielectric or water cooling loop which passes through the cells, extracting heat therefrom which causes the dielectric or water to boil. In prior art systems the heat picked up by the two phase water coolant loop is transferred to a boiler for boiling water to create steam; or the water may be converted directly to steam within the loop, the steam being separated from the two phase water coolant by a steam separator and removed from the loop for use in the reactor. In the present invention the heat generated within the stack is used to raise the temperature of a relatively large volume of recirculating water to below its boiling point. This large mass of heated liquid water flows through high surface area material in a saturator. The hydrocarbon fuel for the steam reforming reactor is passed, preferably in counter flow manner, through the same high surface area material of the saturator simultaneously with and in contact with the heated water. The water gives up heat by the evaporation of water into the gas stream thereby humidifying the gas stream. Essentially all of the heat of vaporization comes directly from the sensible heat contained in the recirculating water, whose heat has come from the fuel cell stacks. All of the steam required for the steam reforming operation of the powerplant may be generated in this manner, thereby completely eliminating the need for a boiler. Make-up water for the recirculating liquid water loop may be provided by condensing water from the fuel cell reactant gas exhaust streams.

In the present invention steam can be raised at a much higher total pressure than could be raised in boilers of the prior art using the same amount of heat produced by the fuel cells. This is because the total pressure of the gas stream can be considerably higher than the partial pressure of the water in the gas stream after the gas stream has been humidified. Thus, the boiler is required to raise steam at the total pressure while the present invention uses the same heat source to provide steam only at its required partial pressure.

In a preferred embodiment, part of the effluent from the reactor, which contains hydrogen and carbon oxides, is recycled back to the hydrocarbon fuel supply upstream of the saturator. This reduces the required molar concentration of water in the saturator exit gas stream for a given amount of water evaporated making the gas stream easier to humidify by reducing the partial pressure of water in the gas stream leaving the saturator.

The foregoing and other objects, features and advantages of the present invention will become more apparent in the light of the following detailed description of preferred embodiments thereof as shown in the accompanying drawings.

BRIEF DESCRIPTION OF THE DRAWING

The sole FIGURE is a schematic representation of a powerplant according to the present invention.

BEST MODE FOR CARRYING OUT THE INVENTION

Consider, as an exemplary embodiment of the present invention, the powerplant depicted schematically in the drawing. The powerplant is generally designated by the reference numeral 10 and includes a fuel cell stack generally designated by the numeral 12, fuel conditioning apparatus generally designated by the numeral 16, a saturator 20, heat exchanger 22, and an air flow splitter or air control box 26. The fuel cell stack 12 may comprise any conventional type of fuel cells which operate on gaseous reactants, such as, but not limited to, hydrogen and air. The stack 12 will generally comprise a plurality of fuel cells connected in series electrically through a load, but is herein depicted as only comprising a single cell 28, for ease of description, and a thermal management portion or cooler 30. As herein shown each cell includes a cathode electrode 32 spaced from an anode electrode 34, with an electrolyte retaining matrix 36 sandwiched therebetween. The electrodes 32, 34 are connected in series through a load 38. In this preferred embodiment the electrolyte is liquid phosphoric acid, but the invention is not intended to be limited thereto and solid oxide electrolytes, solid polymer electrolytes, molten carbonate electrolytes, and other types are all contemplated as being useful in a powerplant designed according to the present invention. Each cell 28 also includes a cathode gas space 40 on the nonelectrolyte side of the cathode electrode 32 and an anode gas space 42 on the nonelectrolyte side of the anode electrode 34.

The fuel conditioning apparatus 16 of this exemplary embodiment comprises a steam reforming reactor 44 in heat exchange relationship with a reactor burner 46, and a shift converter 48. The fuel conditioning apparatus may also include other equipment such as sulfur removal means. The requirements of the fuel conditioning apparatus are dependent in part upon the type of raw fuel being used and upon the particular design of the cells in the fuel cell stack.

In operation, air enters a compressor 50 via a conduit 56 and is compressed to, for example, 120 psia, which is the desired operating pressure of the powerplant. This pressurized air enters the air control box 26 via a conduit 58. The air box 26 includes controls and valves for properly proportioning the air flow to various components. A portion is directed into the cathode gas space 40 via a conduit 60 and is electrochemically reacted within the cathode electrode 32, in conjunction with the fuel reaction at the anode electrodes 34, to produce electricity, heat and water, some of the water being evaporated back into the air stream flowing through the cathode gas space. The moist cathode exhaust leaves the gas space 40 via a conduit 62. This gas may then be sent to a condenser (not shown) for water recovery and a turbine (not shown) for energy recovery.

A gaseous hydrocarbon fuel, such as methane ($CH_4$), naphtha ($C_nH_m$), natural gas, methane containing coal gas; or the like is introduced into a conduit 66 and pumped by pump or compressor 68 to the desired pressure at which the system is intended to operate, (e.g., 120 psia). A portion of the hydrogen containing processed fuel leaving the conditioner 16 is recycled (through the fuel conditioner 16) by a blower 74 via a conduit 78 and mixed with the incoming hydrocarbon fuel in the conduit 104. The mixture of fresh fuel and recycle flows through the saturator 20 wherein it is humidified by means which will hereinafter be explained. The humidified gas stream is directed from the saturator 20 into the steam reforming reactor 44 via a conduit 70. The humidified stream contains all the water necessary for reforming within the reactor. The steam reforming reactor 44 is of the well-known type which utilizes a nickel catalyst; however, this invention is not intended to be limited to any particular reactor design.

Processed fuel in the form of hydrogen gas, carbon oxides, and some water and other impurities leaves the reactor 44 via a conduit 72 whereupon it enters a shift converter 48 which converts carbon monoxide into additional hydrogen and water. The majority of the processed fuel flows through the anode gas spaces 42 of the stack 12 via a conduit 76. As hereinabove mentioned, a minor portion, such as on the order of 15%, is recycled via the blower 74 and conduit 78 into the conduit 104 to be mixed with the raw fuel therein upstream of the saturator 20. If the raw fuel is a liquid, provisions can be made to vaporize the fuel prior to introduction into the saturator. The processed fuel which enters the anode gas spaces 42 electrochemically reacts within the anode electrode and leaves the anode gas space by means of a conduit 80 whereupon it is directed into the burner 46, along with air from the air box 26 via a conduit 82. The unused hydrogen in the anode effluent combines with the air and is burned to provide the heat for the steam reforming reaction.

Although not shown, the burner exhaust gases in the conduit 84 may be combined with the cathode exhaust gases in the conduit 62 (after water has been removed from the cathode exhaust gases), and the combined exhaust streams expanded through a turbine for energy recovery, such as to drive the compressor 50.

The steam for the steam reforming reactor 44 is generated within the saturator 20 which is herein referred to as a contact saturator since the gas stream is humidified by direct contact with a stream of hot water. The water for the contact saturator 20 recirculates in a loop which is generally designated by the reference numeral 86. The pressure of the water in the loop 86 must be the same as the steam reforming reactor operating pressure. The water in the loop 86 passes alternately through the heat exchanger 22, wherein it picks up heat from the stack 12, and through the saturator 20, wherein a small portion evaporates into the fuel gas stream passing through the saturator, thereby losing heat. A pump 92 recirculates the liquid water back to the heat exchanger 22 where it is reheated.

In accordance with the present invention, all the heat needed to maintain the temperature of the water entering the saturator 20 at a level suitable for purposes of the present invention is heat generated by the electrochemical reactions within the stack 12. As shown herein for illustrative purposes, this heat is picked up by a dielectric or water in a recirculating, closed two phase coolant loop 88. The coolant in the loop 88 passes in heat exchange relationship to the cells via a cooler 30 whereupon it is heated to boiling, the heat of vaporization providing a large part of the heat absorbing function of the coolant. In the heat exchanger 22 the two phase coolant gives up sensible heat as well as heat of condensation equal to its heat of vaporization to the liquid water in the closed loop 86. The condensed coolant in the loop 88 exits the heat exchanger 22 and is recirculated to the cooler 30 and back to the heat exchanger 22 by a pump 90.

The pressure of the water in the loop 86 is such that, although heated close to the temperature of the coolant in the loop 88, it remains liquid. In the saturator 20 the heated liquid water flows over high surface area inert material such as plastic, ceramic or metallic saddles, rings, or suitable packing material or trays, thereby creating a high total surface area of liquid film within the saturator. This facilitates heat and mass transfer between the hot liquid water and the fuel gas stream from the conduit 104. In the preferred mode the gas passes over this wetted packing material in a direction counter current to the liquid water flow. The circulating liquid water in the loop 86 gives up sensible heat in the saturator 20, which heat provides the bulk, if not all, the heat required to humidify the gas stream. The driving force for this evaporation and humidification process is due to the difference between the local liquid hot water temperature (within the saturator) and the gas saturation temperature at that location. (A small portion of the heat used to evaporate the water in the saturator 20 may come from the fuel inlet gas if it enters the saturator at a higher temperature than its exit temperature, although it is preferable to operate the saturator at lower fuel gas inlet temperatures to maximize the use of cell stack waste heat).

The gas stream continues to pick up water from the hot liquid water stream as it evaporates and approaches a saturation temperature equal to the hot water inlet temperature. The size and efficiency of the contact saturator will determine how close the gas stream will approach this saturation temperature. For example a contact saturator might be designed to provide a saturation temperature within 10° F. of the inlet water temperature. Make-up water for the loop 86, suitably treated, enters via conduit 102. The make-up water may be provided by condensing water from the powerplant exhaust streams or from the fuel cell powerplant site.

The amount of recirculating water required in the loop 86 to provide, by sensible heat, the energy requirements of the saturator as heat of vaporization can be determined easily from the water evaporation requirement and the temperature change of the circulating liquid water across the saturator. A 50° F. change in water temperature would require a liquid water circulation rate of about 18 times the steam evaporation rate.

In this invention essentially all of the heat for vaporizing the liquid within the saturator 20 comes from the stack 12 via the coolant loop 88 and the heat exchanger 22. The total pressure of the humidified gas stream leaving the saturator 20 is essentially the same as its total pressure entering the saturator 20. The partial pressure of water in the humidified gas stream leaving the saturator 20 depends upon the number of moles of gas entering the saturator and the amount of water evaporated. To make it easier to humidify the gas stream, its required saturation temperature and saturation pressure may be reduced by increasing the number of moles in the incoming gas stream. This is done in the present embodiment by recycling a portion of the fuel conditioning apparatus gas products into a conduit 78 to mix with the raw fuel in the conduit 104 upstream of the saturator. The appropriate amount of recycle flow will depend upon the molar amount of the raw fuel and other needs of the system. The benefits which may be gained by the ability to control the saturation temperature and saturation pressure of the fuel gas exiting the saturator by the addition of recycle are: a possible reduction in size of the saturator 20; a possible increase in system operating pressure at the cell operating temperature; or, a lower fuel cell operating temperature at the same system operating pressure.

By this invention the pressure of the gas stream entering the steam reforming reactor, containing all the steam necessary for the reaction, can be set at a level higher than that which can be achieved by generating raw steam in a boiler heated directly by the fuel cell stack waste heat, which is the case in prior art powerplants. Thus, the maximum pressure within the reactor 44 is not limited by the temperature of the fuel cell, even though that temperature would be insufficient to raise steam to that desired pressure in a boiler.

EXAMPLE

A phosphoric acid fuel cell is assumed to operate at 150 psia and an average temperature of 380° F. At an operating voltage of 0.6 to 0.65 volts, the cell, operating on methane, can generate enough heat to produce 5 or 6 moles of steam per mole of methane. Assuming a 20° F. difference in temperature between the cell and the cell coolant in the loop 88, and another 20° F. difference between the temperature of the coolant in the loop 88 and the water circulating in the loop 86, the temperature of the water entering the saturator 20 will be 340° F. Also, assume the fuel feed for the steam reforming reactor consists of one mole of $CH_4$ combined with a recycle gas in an amount consisting of 0.2 moles $CO_2$, 0.8 moles $H_2$, and 0.2 moles of $H_2O$. This combined stream is introduced into the saturator 20 at an assumed temperature of 325° F. The saturation temperature of this gas is 208° F. It is desired to add three moles of water to the gas. This will increase the saturation temperature of the gas stream to 322° F. The amount of liquid water circulating in the loop 86 and the temperature change of that water as it flows through the saturator is set (by appropriate size and construction of the saturator) to provide the energy required to evaporate the three moles of water. Assume the temperature of the liquid water in the loop 86 at the inlet to the saturator 20 is 340° F., which is 19° F. below its boiling point at 150 psia. Assume a temperature change of 40° F. such that the exiting water temperature is 300° F. In this example approximately 22 moles of water will have to be circulated in the loop 86 per mole of water evaporated based upon the ratio of the heat of vaporization of water to the product of the water heat capacity and its temperature change. The resulting mole fraction of water in the gas stream at the exit of the saturator 20 will be 0.615. The partial pressure of water in the gas stream will be 92.2 psia and its saturation temperature will be 322° F. Thus, in this example, the difference between the circulating hot water temperature and the gas saturation temperature at the gas inlet to the saturator 20 is 92° F.; and the difference is 18° F. at the gas outlet.

Although the invention has been shown and described with respect to a preferred embodiment thereof, it should be understood by those skilled in the art that other various changes and omissions in the form and detail thereof may be made therein without departing from the spirit and the scope of the invention.

I claim:

1. In a process for operating a fuel cell powerplant, the powerplant comprising a steam reforming reactor, a saturator, and a fuel cell stack including anode gas compartments and cathode gas compartments, the steps of:
    (a) introducing a stream comprising a hydrocarbon fuel and steam into the steam reforming reactor and reforming the fuel therein to produce hydrogen, the gas stream including substantially all the steam necessary for the step of reforming;
    (b) directing hydrogen produced in the reactor into and through the anode gas compartments of the stack;
    (c) directing an oxygen containing gas into and through the cathode gas compartments of the stack;
    (d) electrochemically reacting the hydrogen and oxygen within the stack to produce electricity, heat and water;
    (e) continuously circulating a mass of liquid water, in a loop, at a pressure at least as great as the operating pressure in the steam reforming reactor, wherein the water is alternately reduced in temperature and then reheated on each pass through the loop, the step of reheating including reheating said water as it circulates to a temperature below its boiling point using only the heat generated in said fuel cell stack by passing said liquid water in indirect heat exchange relationship with said stack, said step of reducing the water temperature including passing said heated water through said saturator;
    (f) passing the stream of hydrocarbon fuel, prior to its being introduced into the reactor in step (a), through the saturator simultaneously with said heated water and in direct contact with the heated water, and adding steam to the hydrocarbon fuel as it passes through the saturator by evaporating some of the heated water into the fuel stream, the heat of vaporization being provided by the heat in the water passing through the saturator, whereby said water drops in temperature as it passes therethrough, the amount of steam in the fuel stream leaving the saturator being substantially all the steam required in the step of reforming the fuel; and
    (g) adding water to the water circulating in the loop to replenish the water evaporated therefrom in the saturator.

2. The process according to claim 1 including the step of recycling a portion of the reaction products from the reactor into the stream of hydrocarbon fuel upstream of the saturator.

* * * * *